Aug. 21, 1956     O. J. PETERSON     2,759,683
TRACTOR FENCER

Filed Jan. 11, 1951     2 Sheets-Sheet 1

Olaf J. Peterson
INVENTOR.

BY *[signatures]*
Attorneys

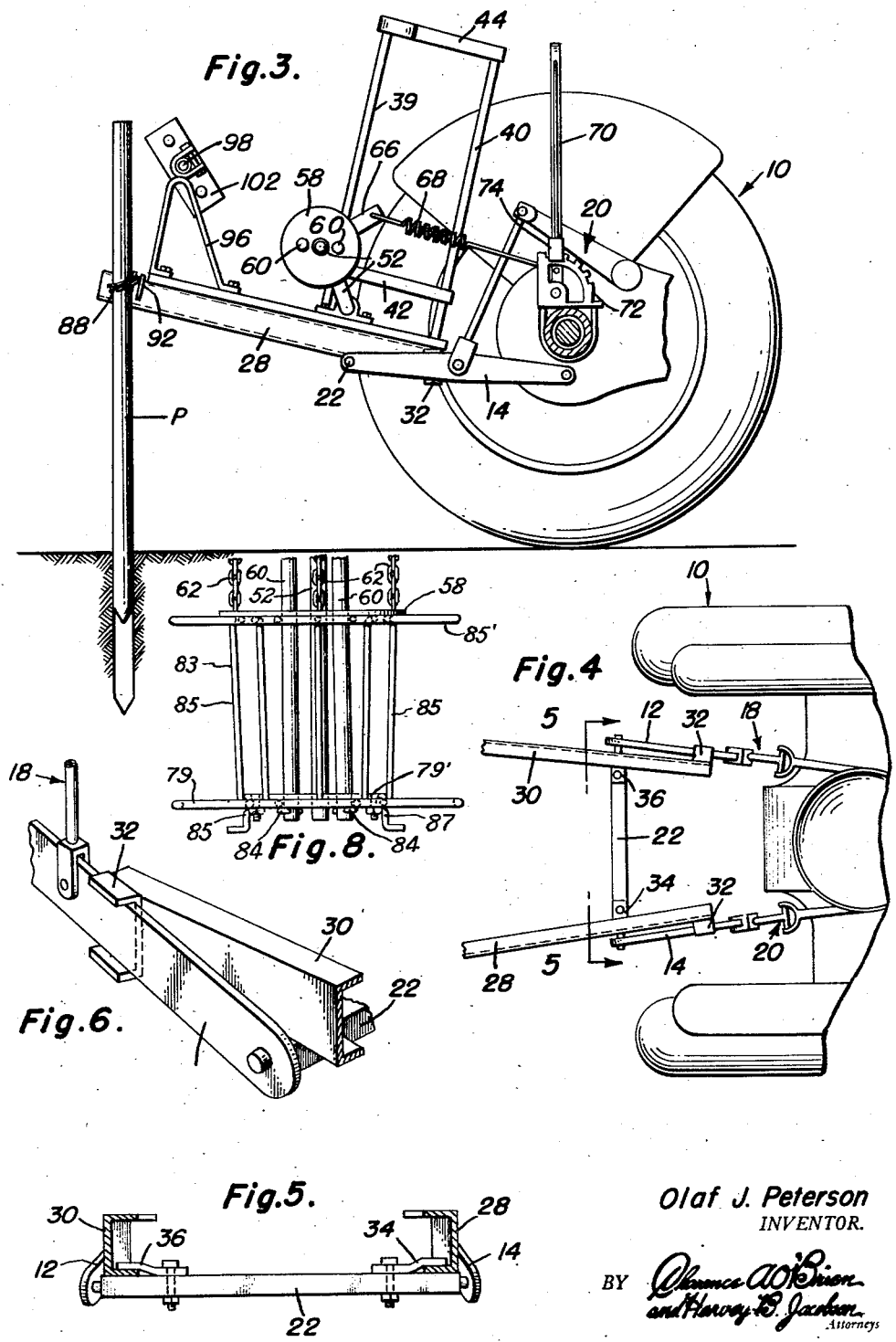

United States Patent Office 2,759,683
Patented Aug. 21, 1956

2,759,683

TRACTOR FENCER

Olaf J. Peterson, Zumbrota, Minn.

Application January 11, 1951, Serial No. 205,475

3 Claims. (Cl. 242—90)

This invention relates to an improved attachment for a tractor.

An object of this invention is to provide a structurally improved and new attachment for a tractor which makes it possible to fence land more easily, quickly and cheaply than present practice. Other objects and features of importance will become apparent in following the description of the illustrated form of the invention.

In the drawings:

Figure 3 is a fragmentary sectional view of a tractor showing the attachment used for setting a post;

Figure 4 is a fragmentary plan view of a tractor showing the means of mounting the platform on the drawbar thereof;

Figure 5 is an enlarged sectional view, taken substantially on the line 5—5 of Figure 4, and in the direction of the arrows;

Figure 6 is a fragmentary perspective view showing further the means of attaching the platform to the tractor drawbar;

Figure 8 is a fragmentary plan view of a reel to be used in picking up fencing wire.

Figure 1:
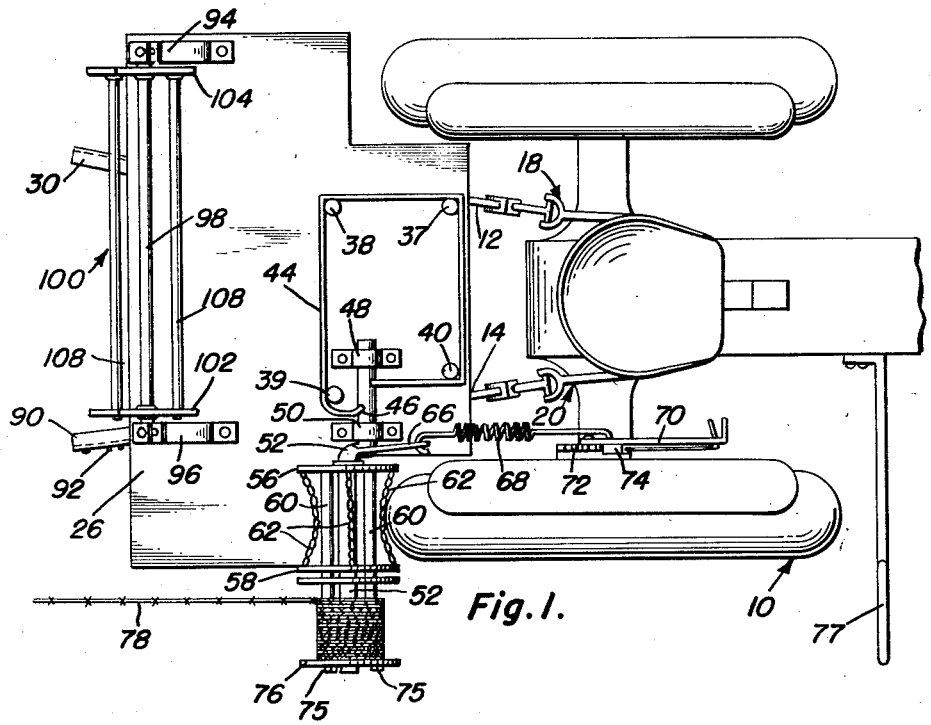
Figure 1 is a fragmentary plan view of a tractor having the attachment thereon.
Figure 2:
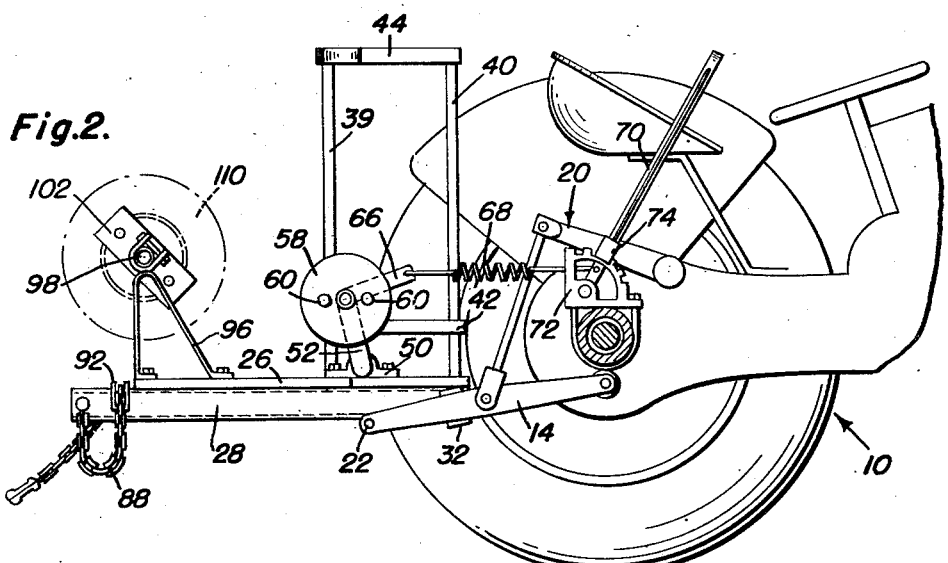
Figure 2 is a sectional view of a part of a tractor, the attachment being located thereon and showing the device in condition for stringing.
Figure 7:
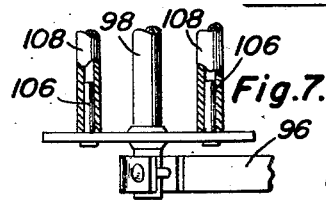
Figure 7 is a fragmentary sectional view showing a part of the means of holding the fencing to be strung.

In carrying out this invention, I have illustrated by way of environment a fragmentary part of a tractor 10. As standard structure of the tractor there are a pair of drawbar sides 12 and 14 which have the lifting linkage assemblies 18 and 20 connected thereto. The transverse support 22 of the drawbar is provided between the sides 12 and 14.

A platform 26 is disposed on a drawbar and held in place by means of a clamping assembly seen best in Figures 4-6. The assembly comprises a pair of inwardly opening channels 28 and 30, each channel being provided with a substantially U-shaped clamp 32 at its inner end arranged to embrace a part of the side, 14 or 12, nearest to it. The channels rest upon the cross member 22 of the drawbar and are held fixed to it by the clamps 34 and 36 (Figure 5) which are bolted to the cross member 22. The panel comprising the platform 26 is disposed thereon and fixed to it by standard means, as welding.

A plurality of spaced vertical posts 37, 38, 39 and 40 are fixed at their lower ends to the panel 26 and bands 42 and 44 are secured thereto. The upper band is provided with an entrance and discharge slot 46 through which the posts which are retained in the enclosure formed by the bands may be inserted or removed. By using the structure so defined, a supply of posts P may be retained in the vertical position within the enclosure.

Bearings 48 and 50 are fixed to the upper surface of the platform 26 in order to accommodate the rock shaft or crank 52. This crank has a tractor wheel contacting assembly disposed thereon and, as shown, consists of first and second offset portions interconnected by a web portion.

The tractor wheel engaging assembly consists of a pair of end panels 56 and 58 which are held in spaced relationship by means of the bars 60. The spaced panels 56 and 58 serve as supports for the chains 62, cables or the like, the chains being so located as to contact the outer surface of the tire of one wheel of the tractor. Therefore, when the tractor moves either forward or rearwardly, rotation is imparted to the wheel contacting assembly.

In order to move the crank 52 on which the wheel contacting assembly is located, there is an arm 66 fixed to the crank 52, this arm being apertured and having a spring 68 with one end located in the aperture. The opposite end of the spring is disposed in an aperture in the lever 70, this lever being pivoted at its lower end by means of a pivot pin which is carried by the quadrant 72. This quadrant having a number of teeth thereon is used in forming a part of a latching device to hold the lever 70 in a selected position. A dog 74 of standard construction is operatively connected with a handle for operation thereof, the dog and handle being carried by the lever 70.

Accordingly, upon actuation of the lever 70, the crank 52 is rotated in one direction or the other thereby moving the wheel engaging assembly into or out of contact with one wheel of the tractor.

As the assembly is rotated, the standard spool or reel 76, which is also fixed to the rods 60 by the cotter pins 75, is rotated. Accordingly, wire 78, disposed on the spool 76 is payed out as the tractor moves in one direction through a field.

In order to wind in the wire 78 another attachment is used in conjunction with the wire guide 77 which is tractor mounted. The specific structure of this attachment is exemplified in Figures 8 and 9, and it is interchangeable with the spool 76.

Figure 9:
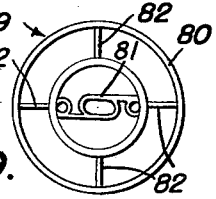
Figure 9 is an elevational view of the removable end of the reel.

There is a wire outer ring 80 having legs 82 extending therefrom. These legs extend inwardly toward each other as they approach the bearings 81 in which the shaft 52 and rods 60 are disposed. The bearings, ring and legs constitute an outer end panel 79 of the reel 83, and the reel 83 is removably held in place on the rods 60 by the cotter pins 84 which are carried by the rods 60. The reel 83 has tapered sides 85 extending from a back panel 85' which abuts the panel 58, and the tapered sides are connected to an outer wire hub 79' which has the end panel 79 bolted to it and held in place by the handled nuts 87 (Figure 9). The bolts for the nuts 87 are secured to hub 79' and pass through eyes in outer panel 79.

In order that a post be driven in the ground easily or removed from the ground, the chain 88 is adapted to be used. This chain has one end connected to one of the channels 28 or 30 and is arranged to be clamped to the bracket 90, which is carried by the platform, by using clamps 92 carried by the arm 90. The clamp 92 is so arranged that one of the links of the chain 88 may simply be fitted therein after the chain has been wrapped around the post P as disclosed in Figure 3. Then, upon actuation of the standard lift arms of the tractor drawbar the post may be either raised or lowered.

Mounting brackets 94 and 96 are fixed to the platform 26 to accommodate the shaft 98 of the reel generally indicated at 100. This reel consists of end members 102 and 104 having pins 106 extending therefrom, these pins being arranged in the bores of the tubes 108 constituting the rungs of the reel. Accordingly, when standard fencing 110 is located on the reel 100 and the tractor is moved forward, if one end of the fencing is held fixed, the fencing will be played outwardly so that it may be fastened to the standard fence posts.

Having described the invention, what is claimed as new is:

1. In combination with a tractor, a fencing attachment, said fencing attachment comprising a platform attached to the drawbars of the tractor, a rock shaft mounted on said platform, said rock shaft comprising first and second offset portions and a web interconnecting said portions, said first portion being journaled on said platform and said second portion being disposed above said platform adjacent a wheel of the tractor, a tractor wheel contacting assembly rotatably mounted on said second portion for engaging the tractor wheel upon rocking movement of the rock shaft in one direction, a reel rotatably mounted on said second portion and fixedly secured to said wheel contacting assembly for rotation therewith, said wheel contacting assembly comprising a pair of spaced disks rotatably journaled on said second portion, rods retaining said disks in spaced apart relation, flexible elements extending loosely between and attached at their ends to said disks adjacent the disk peripheries, said elements being circumferentially spaced around said disks for frictional engagement with the tractor wheel.

2. In combination with a tractor, a fencing attachment, said fencing attachment comprising a platform attached to the drawbars of the tractor, a rock shaft mounted on said platform, said rock shaft comprising first and second offset portions and a web interconnecting said portions, said first portion being journaled on said platform and said second portion being disopsed above said platform adjacent a wheel of the tractor, a tractor wheel contacting assembly rotatably mounted on said second portion for engaging the tractor wheel upon rocking movement of the rock shaft in one direction, a reel rotatably mounted on said second portion and fixedly secured to said wheel contacting assembly for rotation therewith, an arm extending perpendicularly from the web of said rock shaft and lever means interconnecting said arm to the tractor frame for rocking the rock shaft to selected positions for varying the frictional engagement between the wheel contacting assembly and the tractor wheel, said wheel contacting assembly including a pair of spaced disks rotatably journaled in said shaft and interconnected by a pair of spacing rods, said rods having portions thereof extending through one of said disks and terminating remote therefrom, said reel being mounted on the extending portions of said rods, circumferentially spaced flexible chain elements extending loosely between said disks adjacent the periphery thereof for frictional engagement with the tractor wheel.

3. In combination with a tractor, a fencing attachment, said fencing attachment comprising a platform attached to the drawbars of the tractor, a rock shaft mounted on said platform, said rock shaft comprising first and second offset portions and a web interconnecting said portions, said first portion being journaled on said platform and said second portion being disposed above said platform adjacent a wheel of the tractor, a tractor wheel contacting assembly rotatably mounted on said second portion for engaging the tractor wheel upon rocking movement of the rock shaft, said wheel contacting assembly comprising a pair of spaced disks rotatably journaled on said second portion, spacing rods between said disks and attached thereto retaining them in spaced apart relation, flexible elements extending loosely between and attached at their ends to said disks adjacent the disk peripheries, said elements being circumferentially spaced around said disks for frictional engagement with the tractor wheel, a reel rotatably mounted on said second portion and fixedly secured to said wheel contacting assembly for rotation therewith, an arm extending perpendicularly from the web of said rock shaft and lever means interconnecting said arm to the tractor frame for rocking the rock shaft to selected positions for varying the frictional engagement between the wheel contacting assembly and the tractor wheel, said lever means including a toothed quadrant mounted on said tractor frame, a lever pivotally attached to said quadrant and having means thereon selectively engageable with said teeth and resilient means interconnecting said rocker arm and said lever.

References Cited in the file of this patent

UNITED STATES PATENTS

| | | |
|---|---|---|
| 456,577 | Krohe | July 28, 1891 |
| 576,408 | Lindgren | Feb. 2, 1897 |
| 784,132 | Bailey | Mar. 7, 1905 |
| 827,598 | Asper | July 31, 1906 |
| 905,974 | Ziegler | Dec. 8, 1908 |
| 1,255,872 | Fentress | Feb. 12, 1918 |
| 2,456,852 | Anderson | Dec. 21, 1948 |
| 2,470,242 | Felsing | May 17, 1949 |
| 2,563,377 | Schmidt | Aug. 7, 1951 |